UNITED STATES PATENT OFFICE.

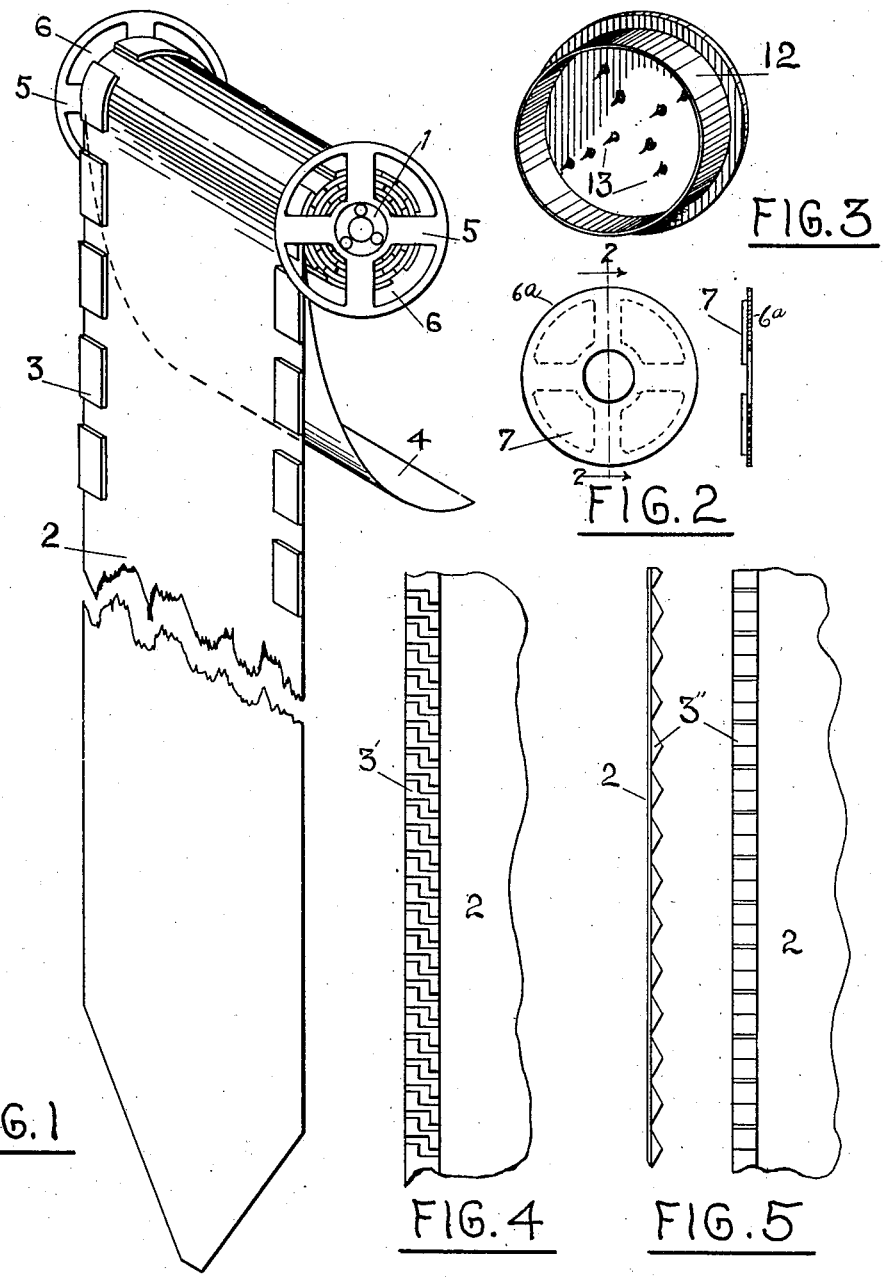

FLETCHER W. BATTERSHALL, OF ALBANY, NEW YORK.

PHOTOGRAPHIC-FILM APPARATUS.

1,148,139.  Specification of Letters Patent.  Patented July 27, 1915.

Application filed April 15, 1907, Serial No. 368,376. Renewed December 21, 1914. Serial No. 878,350.

*To all whom it may concern:*

Be it known that I, FLETCHER W. BATTERSHALL, a citizen of the United States, residing in the city of Albany, in the county of Albany and State of New York, have invented certain new and useful Improvements in Photographic-Film Apparatus, of which the following is a description.

The object of my invention is to render the development of photographic films more convenient, expeditious and inexpensive, and to enable the apparatus to be used in the presence of actinic light at any time or place.

Hitherto the development of photographic films has been carried on by means of devices useful for that purpose only, so that photographers wishing to develop photographic films have found it necessary to provide special apparatus for that purpose. The older and more common form of photographic development required the use of a dark room illuminated only by non-actinic light, while the newer method of development, which may be carried on without using a dark room, requires special apparatus used solely for the purpose of development, thus increasing the number of accessories necessary, as well as the expense.

Instead of using special apparatus for this purpose, I construct the light-tight receptacle which is used for holding the photographic film in such a manner that the film may be developed therein in day light after the receptacle has been removed from the camera. The device comprises, in general, a spool adapted to receive a photographic film, and an opaque strip to protect the film from the light, means being provided in connection with said opaque strip or film, so as to separate the sensitized surface of the film when wound upon the spool from the surfaces adjacent thereto, thereby permitting free access of the developing liquids to said sensitized surface.

Figure 6:
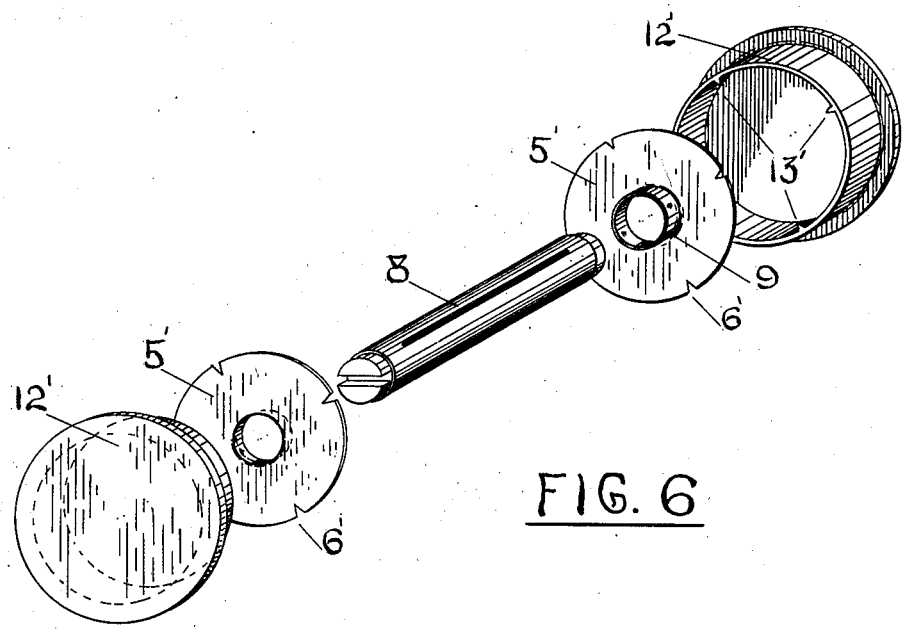
Figure 7:
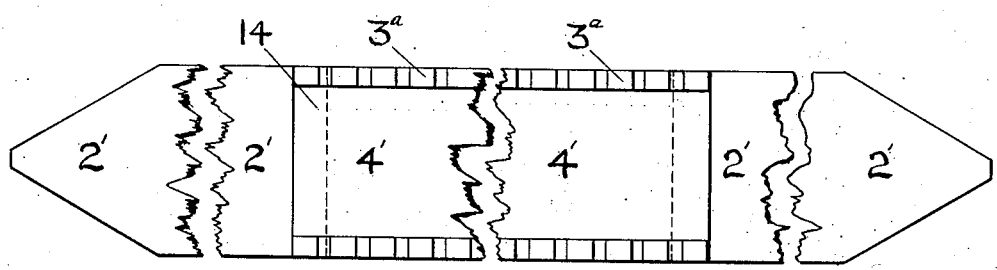

I have shown certain modifications of my invention in the accompanying drawings, in which:

Figure 1 is a perspective view of a spool carrying a sensitized film and an opaque strip; Fig. 2 comprises an end elevation and a vertical cross-section of a light-tight closure for the ends of the spool, the vertical cross-section being taken on the line 2—2 of the end elevation shown in this figure; Fig. 3 is a perspective view of a cup-shaped member used for detaching the light-tight closure shown in Fig. 2; Fig. 4 is an elevational view of one modification of the means used for spacing the sensitized surface away from the adjacent surfaces; Fig. 5 comprises a front elevational view and a side elevational view of another modification of said means; Fig. 6 shows a perspective view of a spool having detachable flanges and cup-shaped members used for detaching the flanges upon the spool; and Fig. 7 shows a plan view of a sensitized film having the spacing means attached directly to said film, said film being provided at its ends with strips of opaque material to effectively exclude the light when the film has been completely wound up upon the spool.

In the drawings, 1 is a spool carrying an opaque strip 2, which is provided along its edges with a plurality of spaced projections 3, the object of which is to maintain the sensitized surface of a strip of film 4 out of contact with the adjacent surface of the opaque strip 2. The spool is also provided on its ends with circular flanges 5, which flanges contain a plurality of apertures 6.

When the spool is being used for obtaining photographic exposures, light-tight closures 6$^a$ are applied to the outside of each of the flanges 5, said closures being provided with a plurality of bosses 7 of the same shape and size as the apertures 6 in the flanges 5. The bosses 7 are preferably also of the same thickness as the thickness of the flanges 5, so that when the closures 6$^a$ are applied to the ends of the flanges 5, the apertures 6 are completely closed and the surfaces of the bosses lie in the same planes as the inner faces of the flanges 5, thereby absolutely preventing the access of any light to the sensitized surface of the film between the convolutions thereof. The light-tight closures 6$^a$ may be constructed of any suitable easily frangible material, but preferably I construct them of opaque paper.

In order to break or remove the light-tight closures 6$^a$ when it is desired to develop the film, I provide a pair of cup-shaped members 12, each of which is designed to be applied over one of the flanges 5. The inner faces of the cup-shaped members 12 have attached thereto a number of spines 13, the purpose of which is to engage and remove the closures 6ª.

In Figs. 4 and 5, I have shown two modifications of the spaced projections. In Fig. 4 the projections 3' are so constructed that the various projections are separated by tortuous passages, so as to prevent the access of light between the convolutions of the film. In Fig. 5 still another modification is shown in which the spaced projections 3" are wedge-shaped instead of flat, as shown in Fig. 1.

In Fig. 6 I have shown another modification of my device in which, instead of providing means for admitting the developing liquids through the surfaces of the flanges, I provide means for entirely detaching or partially displacing the flanges. It is a well-known fact that the flanges ordinarily provided upon the ends of spools for photographic films are attached to the ends of the spools merely by one or more slight indentations in the hub 9 of the flange 5'. The purpose of this modification of my invention is to detach or displace these flanges, and in order to accomplish this purpose, I provide a pair of cup-shaped members 12' having inwardly projecting teeth 13', which are designed to pass over the edges of the flanges and firmly grip the same, so that by pulling outwardly said flanges may be loosened or removed. The flanges 5' are provided with notches 6' to permit the passage of the teeth 13' over the edges of the flanges.

In Fig. 7 I have shown a different method of applying the spaced projections. In this modification the projections 3ª are applied directly to the surface of the film 4', and the ends of the film are provided with extensions 2' made of opaque material.

In the operation of the modification of my invention shown in Figs. 1, 2 and 3, a series of photographic exposures are made by inserting the spool 1, carrying the light-tight closures 6ª, into a camera, and completing the exposure in the usual manner. When the exposures are completed and the roll of film is entirely wound upon the spool, the spool is removed from the camera and the cup-shaped members 12 are applied to the flanges 5 of the spool. By causing the spines 13 to engage the light-tight closures 6ª, the latter can now be loosened or removed, it being understood that the cup-shaped members 12 are continually maintained over the flanges 5. The spool of film thus prepared can now be inserted in a bath of developing liquid. By moving the film backwardly and forwardly, the liquid can now be caused to enter between the convolutions of the film until the development is complete. The application of other liquids is accomplished in a similar manner until the film is entirely developed and fixed. In case the modification of the spaced projections, shown in Fig. 4, is used, the light-tight closures 6ª and cups 12 can be completely dispensed with, inasmuch as no light can enter through the passages between the projections 3'. The light-tight closures 6ª and the cups 12 may, however, be used as a safeguard, if desired. The modification shown in Fig. 6 operates in a similar manner, except that instead of loosening or removing the light-tight closures 6ª, the flanges 5' themselves are loosened or removed, so as to permit access of the various liquids to the sensitized surface of the film.

The modification of the film shown in Fig. 7 may be applied to either of the different forms of spools above described, and the operation of the device for this form of film would be the same except that the surface of the film, instead of being spaced from the adjacent surface of an opaque strip, would be spaced from the adjacent non-sensitized surface of the film itself.

While I have described my invention above in detail, I wish it to be understood that many changes may be made therein without departing from the spirit of my invention.

I claim:—

1. A camera cartridge roll of film having means to exclude light, said means being formed and arranged so that the form and arrangement are conducive to the exclusion of light and admission of liquid.

2. A camera cartridge roll of film having means to separate adjacent film surfaces and exclude light, said means being formed and arranged so that the form and arrangement are conducive to the exclusion of light and admission of liquid.

3. In a device for developing photographic films, a strip of flexible opaque material adapted to be wound upon a film cartridge roll in a camera and having its longitudinal edges thickened, said thickened portions having channels therethrough of a tortuous conformation adapted to allow the ingress and egress of chemical reagents but excluding light when wound upon the roll.

4. In a device for developing photographic films, a spool adapted to be used in a camera to receive a sensitized film after exposure having flanges at the ends thereof with apertures therein, removable closures for said apertures respectively, and a means for removing said closures and preventing light from passing through said apertures.

5. In a device for developing photographic films, a spool of film adapted to be used in a camera, said spool having a perforated flange separating the convolutions of the film and a removable light-tight closure adapted to cover the openings in the flange and leave the film free to be wound up or unwound.

6. In a device of the character described, the combination of a photographic-film cartridge roll, said cartridge being provided with an apertured flange, a closure for the apertures in said flange and a cup-shaped cover adapted to fit over said closure, said cover being provided with means for engaging said closure to assist in its removal.

7. In a device for developing photographic films, a strip of a flexible material adapted to be wound into a film cartridge in a camera, and having projections on its longitudinal edges, said projections having channels between them adapted to allow the ingress and egress of chemical reagents, but to prevent the direct entry of light when wound into a roll.

FLETCHER W. BATTERSHALL.

Witnesses:
   MARION HATCH FISHER,
   MARGARET K. VAN NORTHRUP.